United States Patent
Fu et al.

(10) Patent No.: US 7,826,994 B2
(45) Date of Patent: Nov. 2, 2010

(54) GPS MODULE TEST SYSTEM FOR AUTOMATICALLY CALIBRATING TEST SIGNAL

(75) Inventors: Yu-Bang Fu, Dasi Township (TW); Hao-Chih Lin, Hsinchu (TW)

(73) Assignee: Altek Corporation, Hsinchu (TW)

( * ) Notice: Subject to any disclaimer, the term of this patent is extended or adjusted under 35 U.S.C. 154(b) by 286 days.

(21) Appl. No.: 12/139,596

(22) Filed: Jun. 16, 2008

(65) Prior Publication Data
US 2010/0001898 A1    Jan. 7, 2010

(30) Foreign Application Priority Data
Dec. 14, 2007    (TW) .............. 96148077 A

(51) Int. Cl.
*G01D 18/00* (2006.01)
*G01C 21/00* (2006.01)

(52) U.S. Cl. .................................................. 702/108

(58) Field of Classification Search ............... 702/108, 702/85; 701/213; 342/357.02, 357.06, 357.12
See application file for complete search history.

(56) References Cited

U.S. PATENT DOCUMENTS

| | | | | |
|---|---|---|---|---|
| 5,883,596 | A * | 3/1999 | Rodal | 342/357.12 |
| 5,949,372 | A * | 9/1999 | Lennen | 342/357.02 |
| 6,114,989 | A * | 9/2000 | Fontes et al. | 342/357.06 |
| 6,266,007 | B1 * | 7/2001 | Lennen | 342/357.02 |
| 6,771,212 | B1 * | 8/2004 | Yee et al. | 342/357.06 |
| 6,816,539 | B1 * | 11/2004 | Rog | 375/147 |
| 7,221,313 | B2 * | 5/2007 | Ganguly et al. | 342/357.02 |
| 7,539,489 | B1 * | 5/2009 | Alexander | 455/423 |
| 2003/0128158 | A1 * | 7/2003 | Jandrell | 342/357.12 |

FOREIGN PATENT DOCUMENTS

| | | | |
|---|---|---|---|
| JP | 10-048323 | * | 2/1998 |
| JP | 2006-324751 | * | 11/2006 |

* cited by examiner

*Primary Examiner*—Cindy H Khuu
(74) *Attorney, Agent, or Firm*—Wormak Nydegger

(57) ABSTRACT

A GPS module test system for automatically calibrating a test signal includes a GPS test fixture, a satellite signal simulator, and a computer. The GPS test fixture carries a GPS module under test and is electrically connected to the same through contact, so as to receive a digital signal generated by the GPS module after the test. The computer receives device information of the GPS module under test through the GPS test fixture, and controls the satellite signal simulator through a GPS signal sample database, so as to generate a GPS analog signal to test the GPS module under test. Thereafter, on receiving the digital signal generated by the GPS module under test and determining the received digital signal is attenuated, the computer automatically gains a transmitted test parameter, so as to transmit the GPS analog signal in a preferable state.

8 Claims, 2 Drawing Sheets

GPS MODULE TEST SYSTEM FOR AUTOMATICALLY CALIBRATING TEST SIGNAL

CROSS-REFERENCE TO RELATED APPLICATIONS

This non-provisional application claims priority under 35 U.S.C. §119(a) on Patent Application No(s). 096148077 filed in Taiwan, R.O.C. on Dec. 14, 2007, the entire contents of which are hereby incorporated by reference.

BACKGROUND OF THE INVENTION

1. Field of Invention

The present invention relates to a GPS module test system, and more particularly to a GPS module test system for automatically calibrating a test signal.

2. Related Art

Global position system (GPS) is a kind of technology for precisely positioning the coordinates of an object, such as a vehicle or a ship. The earlier GPS technology was developed by the United States Department of Defense for military purposes. Now, the GPS technology switches to civil applications from the military fields, for example, map navigation. Some electronic equipments, such as personal digital assistants (PDAs), computers, mobile phones, and watches, are all provided with a micro GPS module, such that the navigation function of the electronic equipments can be used anywhere at anytime. A GPS module includes an antenna, an RF, and an analog-to-digital converter (ADC). After the antenna receives a weak signal transmitted from a GPS satellite, the signal is amplified to an appropriate extent by an RF component. Subsequently, the frequency is reduced to an intermediate frequency (IF) band or a baseband. Afterward, the ADC component converts analog signals into digital signals, and then desired information such as coordinates and time are resolved from the digital signals.

However, since the GPS signal is a quite weak satellite signal, production problems must be taken into consideration on the design of the GPS module, so as to make sure that the designed/produced GPS module is usable (i.e., the GPS module is able to correctly receive and resolve a weak GPS signal). In order to ensure the signal resolution accuracy and the usability of the GPS module, GPS module test becomes a critical step in manufacturing the GPS module. At present, a common method of testing a GPS module is to first weld the GPS module onto a test board, and then test the GPS module with a test program provided by a GPS module manufacturer. Thus, the welding quality may directly influence the test quality of the GPS module (affecting the receiving power of the GPS module, and thus reducing the db value thereof). In addition, a tester is unable to control a satellite signal simulator to adjust the RF power, and a test fixture does not have the function of auto calibration (i.e., to confirm that the sensitivity of this test is the same as that of the previous one). Further, the conventional test fixture does not have the function of automatically determining pass/failure (i.e., automatically determining whether the GPS module is qualified), and cannot test GPS modules repeatedly. Thus, when another GPS module is to be tested, the previously tested GPS module must be disordered first, and then the GPS module under test is welded, so the operation is rather troublesome.

SUMMARY OF THE INVENTION

In order to solve the above problems that it is time and energy consuming to test a GPS module, and the fixture cannot be automatically calibrated, the present invention is directed to a GPS module test system for automatically calibrating a test signal. A GPS test fixture carries and electrically connects a device under test through contact, so as to simplify the process of testing a GPS module. When a digital signal is attenuated, a computer controls a satellite signal simulator to dynamically gain a transmitted GPS analog signal, thereby enhancing the test accuracy.

In order to achieve the above objective of automatically calibrating a test signal, the GPS module test system for automatically calibrating a test signal provided by the present invention includes a GPS test fixture, a satellite signal simulator, and a computer. The GPS test fixture carries and electrically connects a GPS module under test through contact, and receives a digital signal generated by the GPS module. The satellite signal simulator generates a GPS analog signal to test the GPS module under test. The computer is connected to the GPS test fixture and the satellite signal simulator through a signal cable respectively. Moreover, the computer performs the following steps. First, the computer receives device information of the GPS module under test transmitted by the GPS test fixture, and finds a corresponding standard test signal parameter (golden sample) from a GPS signal sample database. Next, according to the standard test signal parameter, the computer controls the satellite signal simulator to generate a GPS analog signal to test the GPS module under test. Then, the computer receives the digital signal generated by the GPS module under test through the GPS test fixture, and automatically gains a test parameter to a level when the digital signal is attenuated. Finally, the computer employs the gained test parameter to control the satellite signal simulator to compensate the GPS test signal through auto gain. In addition, the GPS signal sample database is built in the computer, for storing standard test signal parameters corresponding to various GPS modules and the digital signal generated by the GPS module under test fed back in the previous test.

According to the GPS module test system in a preferred embodiment of the present invention, the satellite signal simulator transmits a GPS test signal to the GPS module under test through a signal cable or an RF antenna. Further, the communication protocol adopted by the signal cable may be a general purpose interface bus (GPIB), a universal serial bus (USB), or an asynchronous transmission standard interface (recommended standard RS232).

According to the GPS module test system in a preferred embodiment of the present invention, the GPS test fixture includes a carrier board with a plurality of metal contact pads for carrying a GPS module under test; a fixing board for fixing the GPS module under test on the carrier board; and a fixing pillar, disposed on the carrier board and pivoted to the fixing board. When the GPS module under test is placed on the carrier board, the fixing board applies a downward pressure on the carrier board, such that the metal contact pads of the carrier board contact metal contact pads of the GPS module under test, and thus the GPS module under test is electrically connected to the GPS test fixture.

According to the GPS module test system in a preferred embodiment of the present invention, the GPS module test system further includes a display for displaying a human-machine interface for controlling a test program The human-machine interface may be used to set the test parameter of the GPS module under test and display whether the GPS module passes the test.

According to the GPS module test system in a preferred embodiment of the present invention, the test parameter may be selected from a group consisting of GPS signal power, GPS signal sensitivity, test times, simulated satellite traveling speed, satellite number, Doppler shift, satellite traveling cycle, and signal type.

Based on the above, the GPS module test system for automatically calibrating a test signal provided by the present invention employs a GPS test fixture to carry and electrically connect a GPS module under test without welding, so the GPS module under test can be easily replaced. In addition, the computer in the GPS module test system determines whether the GPS signal is attenuated according to a digital signal generated by the GPS module under test, so as to dynamically calibrate the GPS analog signal for testing the GPS module and thus enhance the precision of the module test.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The objectives of the present invention and the provided GPS module test system will be illustrated in detail in the following preferred embodiments. However, the concept of the present invention may also be applied in other scopes. The following embodiments are merely used to illustrate the objectives and implementation of the present invention, instead of limiting the scope of the same.

Figure 1A:
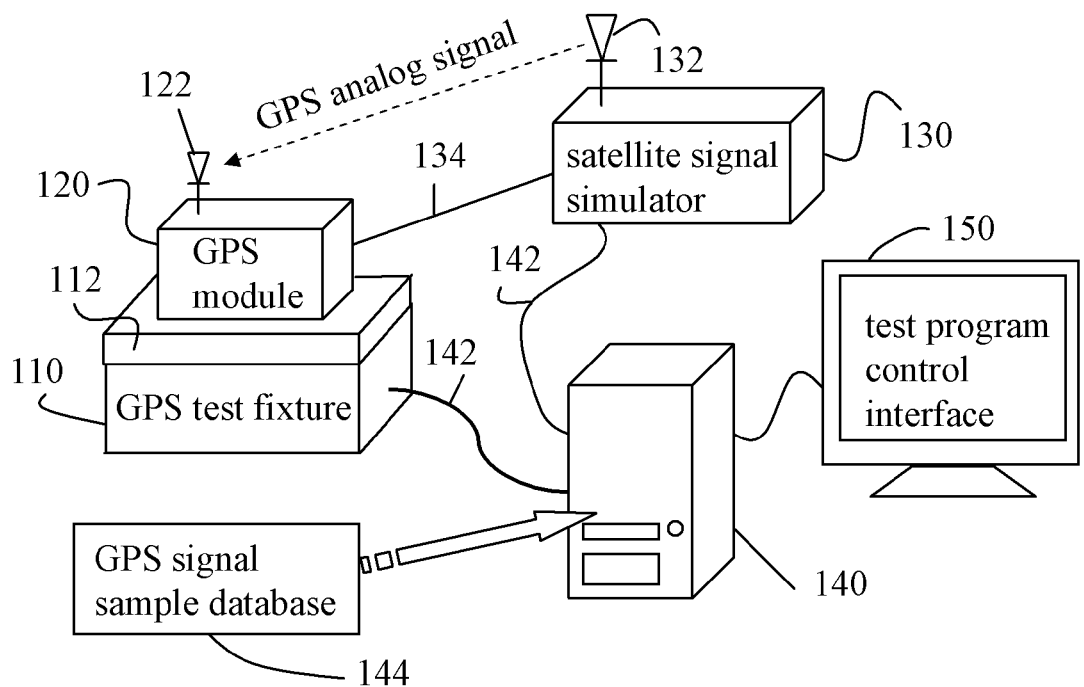
FIG. 1A is a schematic view showing the architecture of a GPS module test system for automatically calibrating a test signal according to a preferred embodiment of the present invention.

FIG. 1A is a schematic view showing the architecture of a GPS module test system for automatically calibrating a test signal according to a preferred embodiment of the present invention. Referring to FIG. 1A, in this embodiment, the GPS module test system for calibrating a test signal includes a GPS test fixture 110, a satellite signal simulator 130, and a computer 140 for controlling a test process. The GPS test fixture 110 has a carrier board 112 disposed thereon for carrying a GPS module under test 120. Further, the GPS test fixture 110 has a plurality of metal contact pads (not shown) on a surface thereof, and likewise, the GPS module under test 120 also has a plurality of metal contact pads (not shown). The GPS test fixture 110 is electrically connected to the GPS module under test 120 through contact, so as to obtain a digital signal generated by the GPS module under test 120 after the test. The satellite signal simulator 130 generates and transmits a GPS analog signal to the GPS module under test 120 to implement a test. The computer 140 for controlling a test process is connected to the GPS test fixture 110 and the satellite signal simulator 130 through a signal cable 142 respectively, and performs the following steps to test whether the GPS module 120 is qualified and usable (i.e., to ensure that the GPS module can receive the GPS signal normally and resolve the accurate positioning information).

First, the computer 140 receives device information of the GPS module under test 120 through the GPS test fixture 110, and finds a corresponding standard test signal parameter from a GPS signal sample database 144. When the GPS module under test 120 is placed on the GPS test fixture 110, the GPS test fixture 110 detects the device type of the GPS module under test 120, and transmits the device information of the GPS module under test 120 to the computer 140. A GPS signal sample database 144 is built in the computer 140, and stores standard test signal parameters corresponding to various GPS modules. According to the standard test signal parameter, the computer 140 controls the satellite signal simulator 130 to generate a GPS analog signal to test the GPS module under test 120. The GPS module under test 120 receives the GPS analog signal through an RF antenna 122, and generates a digital signal. The GPS test fixture 110 reads and transmits the digital signal to the computer 140. After receiving the digital signal, the computer 140 reads the GPS signal sample database 144, and determines whether the digital signal is attenuated. For example, when the satellite signal simulator 130 is set to send a GPS analog signal through an RF antenna 132 at a power of 5 dbi, the GPS module under test 120 feeds back the digital signal after the test. Then, the computer 140 receives the digital signal, and finds out that an originally estimated transmission power of the digital signal is 4 dbi by looking up in the GPS signal sample database 144. Thus, the computer 140 determines that the digital signal is attenuated. Afterward, the computer 140 automatically gains the preset test parameter to a level (for example, the transmitted GPS analog signal is gained to 6 dbi). The computer 140, in the next round of test, adjusts the test parameter to control the satellite signal simulator 130 to automatically gain the GPS test signal (i.e., the GPS analog signal). In this embodiment, the satellite signal simulator 130 transmits the GPS test signal to the GPS module under test 120 through a signal cable 134, such as a general purpose interface bus (GPIB), a universal serial bus (USB), and an asynchronous transmission standard interface (recommended standard RS232); or transmits the GPS test signal to the GPS module under test 120 through the RF antenna 132. In some embodiments, the GPS module test system further includes a display 150 for displaying a human-machine interface for controlling a test program (i.e., a satellite signal test interface).

Figure 1B:
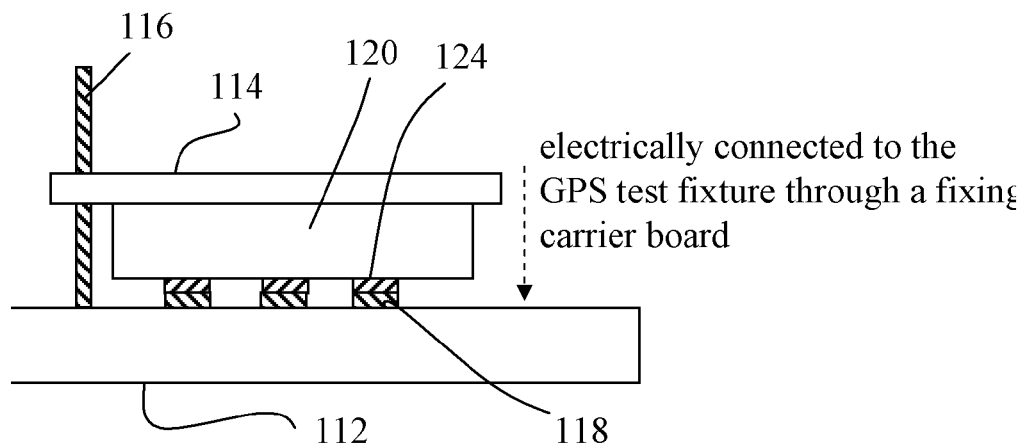
FIG. 1B is a schematic view showing the architecture of the GPS module test system in FIG. 1A carrying a GPS module under test.

Based on the above, in the present invention, a GPS module under test is fixed on and electrically connected to the GPS test fixture through contact, instead of being welded to a test board as in the conventional art. FIG. 1B is a schematic view showing the architecture of the GPS module test system in FIG. 1A carrying a GPS module under test. Referring to FIGS. 1A and 1B together, in this embodiment, the test fixture 110 further includes a carrier board 112, a fixing board 114, and a fixing pillar 116. The carrier board 112 is used to carry the GPS module under test 120, and has a plurality of metal contact pads 118 corresponding to a plurality of metal contact pads 124 on the GPS module under test 120. When the GPS module under test 120 is placed on the GPS test fixture 110, the metal contact pads 118 of the GPS test fixture 110 contact the metal contact pads 124 of the GPS module under test 120, thus achieving electrical connection there-between. The fixing pillar 116 is disposed on the carrier board 112, and the fixing board 114 is pivoted above the fixing pillar 116. The fixing board 114 is used to fix the GPS module under test 120 on the carrier board 112. When the GPS module under test 120 is placed on the carrier board 112, the fixing board 114 applies a downward pressure on the carrier board, such that the metal contact pads 118 of the carrier board 112 tightly contact the metal contact pads 124 of the GPS module under test 120, and thus the GPS module under test 120 is electrically connected to the GPS test fixture 110. In some embodiments, the position of the pivot between the fixing board 114 and the fixing pillar 116 may be calibrated by a user depending on the thickness of the GPS module under test 120, such that GPS modules under test 120 of different sizes can be placed on the carrier board 112.

Figure 2:
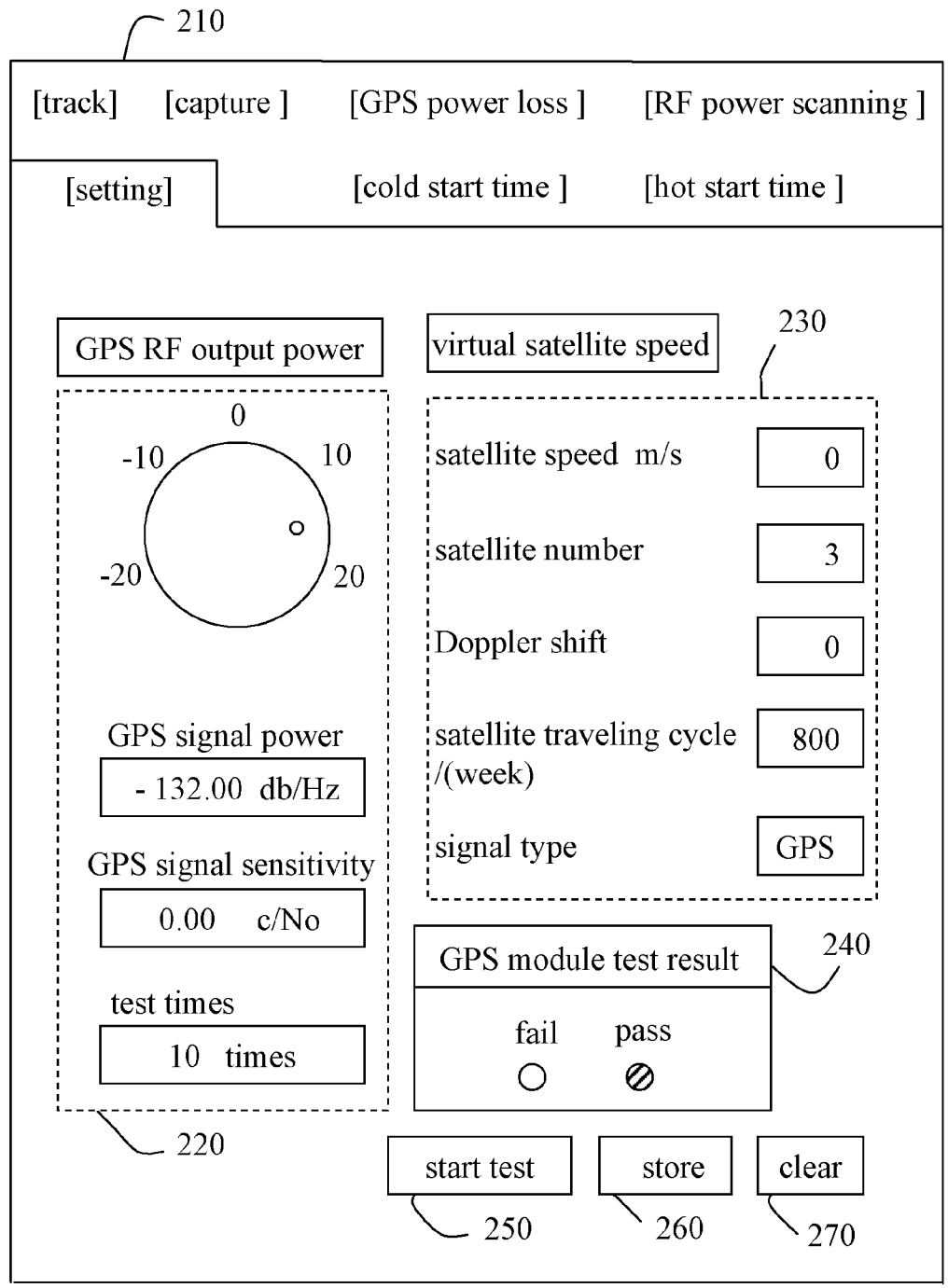
FIG. 2 is a schematic view of an operation interface of a GPS module test system for calibrating a test signal according to a preferred embodiment of the present invention.

FIG. 2 is a schematic view of an operation interface of a GPS module test system for calibrating a test signal according to a preferred embodiment of the present invention. Referring to FIG. 2, a human-machine interface for controlling a test program (i.e., a test program control interface 210) includes a GPS signal parameter setting interface 220 for setting a test parameter, so as to control the satellite signal simulator to generate a GPS analog signal to test the GPS module under test. The satellite simulation parameter setting interface 230 is used to set a virtual satellite traveling speed to simulate a signal transmitted by an actual satellite. A GPS module test result interface 240 is used to display whether the GPS module under test passes the test. After a test parameter is set, or a preset test parameter is directly loaded, the user may press a function key 250 to begin a test, or press a function key 260 to store the set test parameter, or press a function key 270 to clear the set test parameter. In addition, the test parameter may be GPS signal power, GPS signal sensitivity, test times, simulated satellite traveling speed, satellite number, Doppler shift, satellite traveling cycle, or signal type, and the scope thereof is not limited herein.

What is claimed is:

1. A global position system (GPS) module test system for calibrating a test signal, applicable to automatically gain a GPS test signal for testing whether a GPS module under test operates normally, the GPS module test system comprising:
    a GPS test fixture, for carrying and electrically connecting the GPS module under test through contact, and receiving a digital signal generated by the GPS module under test;
    a satellite signal simulator, for generating and transmitting a GPS test signal to the GPS module under test; and
    a computer, connected to the GPS test fixture and the satellite signal simulator through a signal cable respectively, for performing the following steps:
    receiving a device information of the GPS module under test transmitted by the GPS test fixture, and finding a corresponding standard test signal parameter from a GPS signal sample database;
    according to the standard test signal parameter, controlling the satellite signal simulator to generate the GPS test signal to test the GPS module under test;
    receiving the digital signal of the GPS module under test, and automatically gaining a preset test parameter to a level when the digital signal is attenuated; and
    controlling the satellite signal simulator with the gained preset test parameter to calibrate the GPS test signal through auto gain.

2. The GPS module test system as claimed in claim 1, wherein the satellite signal simulator transmits the GPS test signal to the GPS module under test through a signal cable or an RF antenna.

3. The GPS module test system as claimed in claim 2, wherein a communication protocol of the signal cable is one selected from a group consisting of a general purpose interface bus (GPIB), a universal serial bus (USB), and an asynchronous transmission standard interface (recommended standard RS232).

4. The GPS module test system as claimed in claim 1, wherein the GPS test fixture further comprises:
    a carrier board with a plurality of metal contact pads, for carrying the GPS module under test;
    a fixing board, for fixing the GPS module under test on the carrier board; and
    a fixing pillar, disposed on the carrier board and pivoted to the fixing board, wherein when the GPS module under test is placed on the carrier board, the fixing board applies a downward pressure on the carrier board, such that the metal contact pads of the carrier board contact a plurality of metal contact pads of the GPS module under test, and thus the GPS module under test is electrically connected to the GPS test fixture.

5. The GPS module test system as claimed in claim 1, further comprises a display, for display a human-machine interface for controlling a test program executable by the computer.

6. The GPS module test system as claimed in claim 5, wherein the human-machine interface for controlling a test program is used to set the test parameter of the GPS module under test and display whether the GPS module under test passes the test.

7. The GPS module test system as claimed in claim 6, wherein the test parameter is selected from a group consisting of GPS signal power, GPS signal sensitivity, test times, simulated satellite traveling speed, satellite number, Doppler shift, satellite traveling cycle, and signal type.

8. The GPS module test system as claimed in claim 1, wherein the GPS signal sample database is built in the computer, and used for storing standard test signal parameters corresponding to a plurality of GPS modules and the digital signal fed back in the previous test.

* * * * *